United States Patent
Diarra

(10) Patent No.: US 10,341,440 B2
(45) Date of Patent: Jul. 2, 2019

(54) METHOD AND DEVICE FOR TRANSFERRING MESSAGES IN A COMPUTER NETWORK

(71) Applicant: Robert Bosch GmbH, Stuttgart (DE)

(72) Inventor: Aboubacar Diarra, Stuttgart-Feuerbach (DE)

(73) Assignee: ROBERT BOSCH GMBH, Stuttgart (DE)

(*) Notice: Subject to any disclaimer, the term of this patent is extended or adjusted under 35 U.S.C. 154(b) by 267 days.

(21) Appl. No.: 15/074,610

(22) Filed: Mar. 18, 2016

(65) Prior Publication Data
US 2016/0301749 A1    Oct. 13, 2016

(30) Foreign Application Priority Data
Apr. 8, 2015   (DE) .................. 10 2015 206 198

(51) Int. Cl.
  *G06F 15/16*  (2006.01)
  *H04L 29/08*  (2006.01)

(52) U.S. Cl.
  CPC ............ *H04L 67/12* (2013.01); *H04L 67/325* (2013.01)

(58) Field of Classification Search
  CPC ........................... H04L 67/325; H04L 67/12
  USPC ............... 709/246, 239, 209, 248; 455/414.3
  See application file for complete search history.

(56) References Cited

U.S. PATENT DOCUMENTS

| | | | |
|---|---|---|---|
| 6,450,298 B1* | 9/2002 | Koura ................. | B66B 1/34 187/247 |
| 8,954,609 B1* | 2/2015 | Holleman ............ | H04J 3/0667 709/203 |
| 9,319,239 B2* | 4/2016 | Bahren ................ | H04L 12/422 |
| 2003/0065814 A1* | 4/2003 | Ishii ................... | H04L 12/4625 709/239 |
| 2003/0172179 A1* | 9/2003 | del Prado Pavon .. | H04J 3/0655 709/236 |
| 2005/0286892 A1* | 12/2005 | Okubo ................. | H04L 12/437 398/71 |
| 2009/0168808 A1* | 7/2009 | Cho .................... | G04G 7/00 370/503 |
| 2010/0040090 A1* | 2/2010 | Lee ..................... | H04J 3/0673 370/503 |
| 2010/0293598 A1* | 11/2010 | Collart ............... | G06F 17/30056 726/3 |
| 2012/0030495 A1* | 2/2012 | Chandhoke .......... | G06F 1/10 713/400 |
| 2014/0004837 A1* | 1/2014 | Varoglu .............. | H04L 67/1095 455/414.3 |
| 2014/0025999 A1* | 1/2014 | Kessler ............... | G06F 13/4295 714/43 |
| 2014/0337848 A1* | 11/2014 | Llamas ............... | G06F 9/52 718/102 |
| 2014/0351359 A1* | 11/2014 | Grocutt .............. | G06F 1/12 709/209 |
| 2015/0036695 A1* | 2/2015 | Gowda ................ | H04L 47/283 370/474 |

(Continued)

*Primary Examiner* — Thuong Nguyen
(74) *Attorney, Agent, or Firm* — Norton Rose Fulbright US LLP; Gerard Messina

(57) ABSTRACT

A method and a corresponding device are provided for transferring messages in a computer network, characterized in that in a first operating mode prior to the transmission of a message, it is checked whether or not it is a message which relates to a synchronization of nodes of the computer network.

17 Claims, 2 Drawing Sheets

(56) References Cited

U.S. PATENT DOCUMENTS

2015/0222443 A1* 8/2015 Basso .................. H04L 47/29
　　　　　　　　　　　　　　　　　　　　370/230
2015/0287390 A1* 10/2015 Kakeko .............. H04L 61/2038
　　　　　　　　　　　　　　　　　　　　345/1.1
2016/0301749 A1* 10/2016 Diarra ................. H04L 67/325

* cited by examiner

METHOD AND DEVICE FOR TRANSFERRING MESSAGES IN A COMPUTER NETWORK

FIELD OF THE INVENTION

The present invention is directed to a method and a device. The subject matter of the present invention is also a computer program and a machine-readable memory medium.

BACKGROUND INFORMATION

Computer networks are made up of nodes, which are connected via data lines. The computer networks used in vehicles, in particular, in motor vehicles, so-called on-board networks, connect control devices as nodes. The control devices used in a vehicle fulfill various functions for operating the vehicle and in this respect exchange data with one another via the on-board network. In order to ensure the full functionality of the individual control devices in any driving situation of the vehicle as rapidly as possible after start-up of the vehicle or start-up of the on-board network, the on-board network must meet particularly high demands with regard to starting time.

SUMMARY

The method of the present invention has the advantage that the synchronization in the on-board network proceeds in a deterministic and rapid manner. As a result, the individual control devices quickly achieve full functionality.

DETAILED DESCRIPTION

Figure 1:
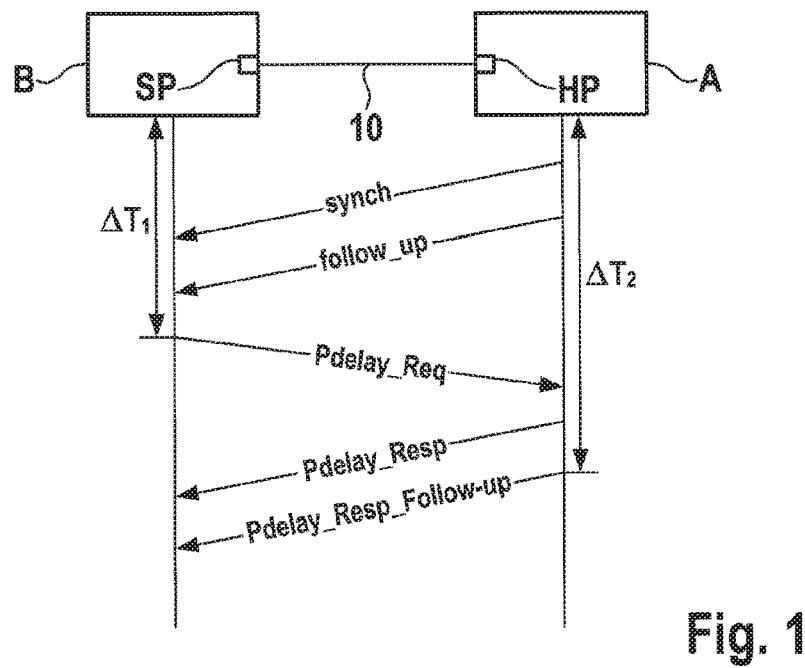

FIG. 1 schematically shows parts of a synchronization process.

Figure 2:
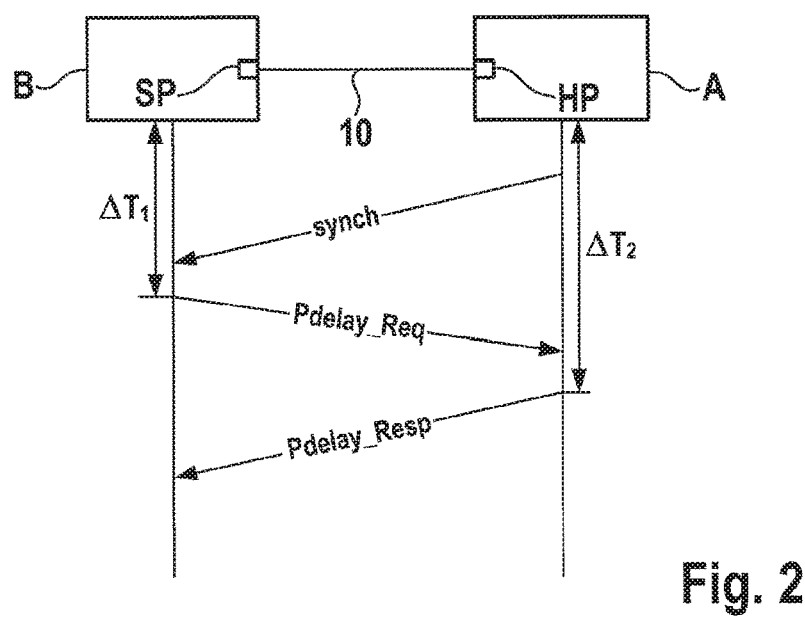

FIG. 2 schematically shows parts of a synchronization process.

Figure 3:
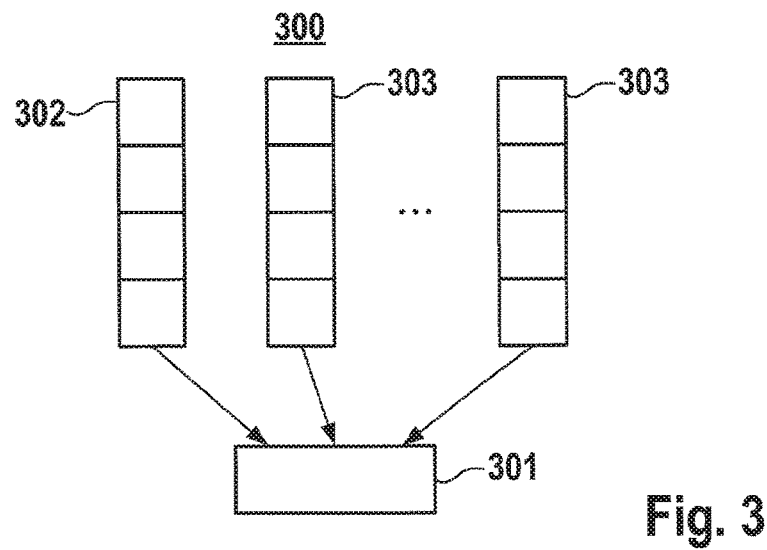

FIG. 3 schematically shows parts of a transmitter.

Figure 4:
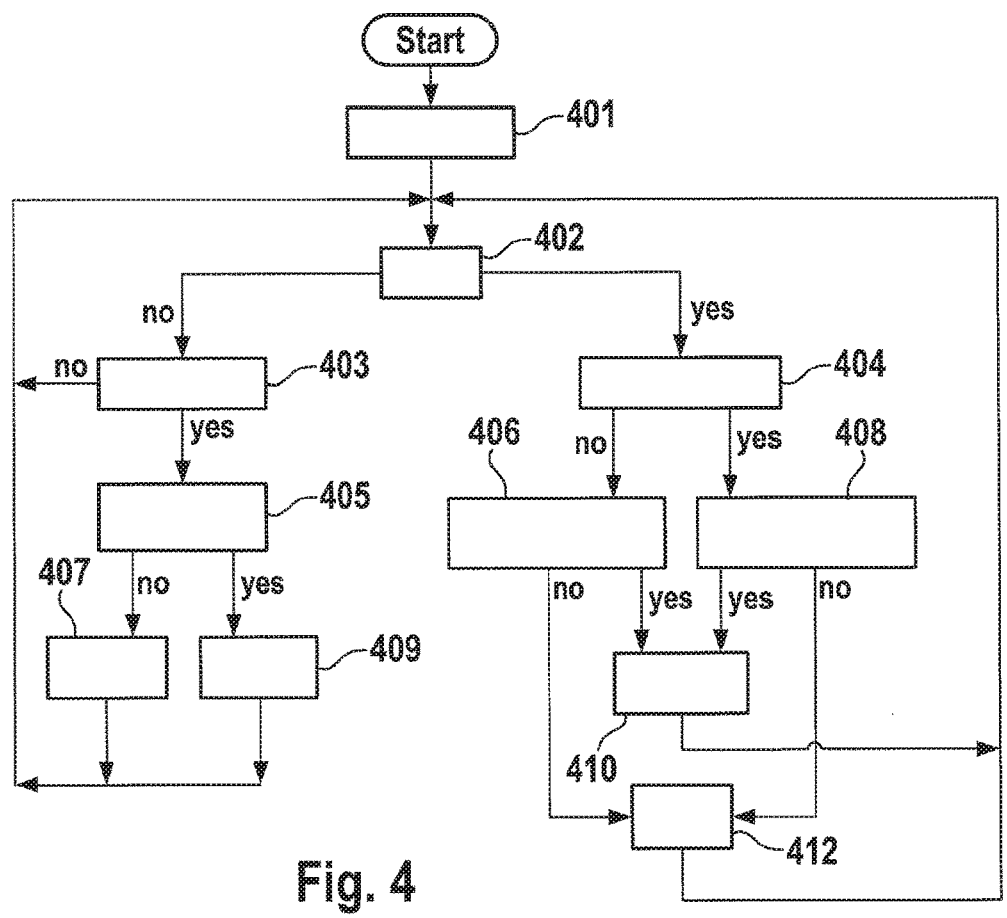

FIG. 4 shows a flow chart with steps of the present invention.

DETAILED DESCRIPTION

FIG. 1 or FIG. 2 schematically shows parts of a synchronization process. The synchronization process preferably proceeds between nodes connected to one another via a data line. The nodes in the example are part of a computer network, for example, an on-board network of a vehicle, in particular, a motor vehicle.

In the example, the synchronization process proceeds between a bridge A and a bridge B. These are connected to one another via a data connection 10, in the example, via an Ethernet Audio Video Bridging (AVB) connection. The synchronization in the example takes place in accordance with the generalized precision time protocol (gPTP) according to IEEE 802.1 AS. Other protocols, such as Ethernet Time-Sensitive Networking (TSN) may also be used.

In the example, bridge A is closer to the Grand Master (GM) node than is bridge B. The selection of the GM node may be permanently predefined, for example, in a static on-board network. Alternatively or in addition, the Grand Master may also be determined with the aid of the Best Master Clock Algorithm (BMCA). As depicted in FIG. 1 or FIG. 2, messages for synchronizing are transferred from bridge A via a master port MP to a slave port SP of bridge B, since bridge A is closer to the GM node than is bridge B.

FIG. 1 shows, by way of example, a signal flow for a synchronization in a two-step procedure.

To synchronize, the GM node transmits a first message "synch", and a second message "follow_up" to all of its ports which are connected to time-conscious systems. Time-conscious systems are referred to below in general as slave. The transfer frequency is 8 Hz, for example. The time at which first message "synch" was sent, is sent from the GM node in the second message, "follow_up". In the example, these messages reach bridge A. Bridge A forwards these messages via a master port MP to slave port SP of bridge B.

A first message "synch" is initially sent from master port MP to slave port SP. A second message "follow_up" is subsequently sent from master port MP to slave port SP.

Bridge B forwards these messages to the slave. Upon receipt of the first message "synch", or the second message "follow_up", the slave sends a third message "Pdelay_Req" to the GM node. This message is forwarded by bridge B via its slave port SP to master port MP of bridge A and from bridge A further to the GM node.

Thereafter, the GM node responds with a fourth message "Pdelay_Resp" and a fifth message, "Pdelay_Resp_Follow-up". The time at which the fourth message, "Pdelay_Resp" was sent, is sent from the GM node in the fifth message "Pdelay_Resp_Follow-up". These are sent via bridge A and bridge B to the slave, as above for the first message "synch" and the second message "follow-up".

The data exchange for the synchronization is completed, for example, when third message "Pdelay_Req" has been sent by the slave or the fifth message "Pdelay_Resp_Follow-up" has been sent by the master. This is the case, as is depicted in FIG. 1, after expiration of time $\Delta T1$ by node A or $\Delta T2$ by node B as of the start of the synchronization.

FIG. 2 shows, by way of example, a signal flow for a synchronization in a one-step procedure.

Unlike the two-step procedure from FIG. 1, the messages referred to there as "follow_up" and "Pdelay_Resp_Follow-up" are omitted. Instead, the transmission point in time is included in the respective message "synch" and "Pdelay_Resp" itself.

Bridge A and bridge B in the example are configured identically. This means that both include one or multiple ports. The ports represent transmitters for the messages, regardless of whether they are a master port or a slave port.

FIG. 3 schematically shows parts of a transmitter 300. For example, bridge A or bridge B includes such a transmitter 300.

Transmitter 300 includes a selection device 301 and at least two queues. In the example, one first queue 302 and seven second queues 303 are provided.

Queues 302, 303 are advantageously designed to store data which are to be sent by transmitter 300. For example, queues 302, 303 are formed in a buffer memory.

Selection device 301 is advantageously designed to select data to be sent by transmitter 300. For example, the selected data to be sent from the buffer memory are written into an output memory.

In the example, transmitter 300 is designed to send data according to the Ethernet AVB standard. Queues 302, 303 in the example are designed to store Ethernet frames.

Transmitter 300 is advantageously designed to differentiate messages for synchronization from other messages. For example, transmitter 300 recognizes the messages for synchronization by their header according to IEEE 802.1 AS.

Transmitter 300 is advantageously designed to store these messages in first queue 302.

Transmitter 300 is advantageously designed to store other messages in one of the two queues 303.

Selection device 301 is advantageously designed to recognize messages for synchronization. For example, selection device 301 is designed to recognize data, which are stored in first queue 302, as messages for synchronization.

Selection device 301 may preferably be operated in a first operating mode and in a second operating mode.

In the first operating mode, it may be provided to preferably select messages for synchronization. For example, it may be provided to decide whether a transfer of messages other than the messages for synchronization is possible, without extending the period of synchronization or starting time. For example, selection device 301 checks for this purpose whether or not first queue 302 is empty. If first queue 302 is empty, no message is currently present for synchronization. In this case, it may be provided to transmit another message from one of the two queues 303.

In the second operating mode, it may be provided that selection device 301 selects the data to be sent according to an Ethernet standard method, for example, the Ethernet AVB standard. In this operating mode, it may be provided that no distinction is made between first queue 302 and second queue 303 for storing messages.

There is preferably switching between the operating modes. For example, evaluation unit 301 is operated in the first operating mode in a starting time, in which, for example, the synchronization takes place.

Selection device 301 is preferably operated in the second operating mode after the synchronization is completed.

The switching between the operating modes takes place in the example in the method depicted in FIG. 4 as a function of the value of a bit isSynch. Selection device 301 in the example is switched to the first operating mode when the bit isSynch has the value TRUE. Otherwise, evaluation unit 301 is switched to the second operating mode.

Bit isSynch is set to TRUE, for example, when the synchronization is completed. At the start of the synchronization process or when the synchronization is lost, bit isSynch is set to FALSE, for example.

In the example of FIG. 1 or 2, time ΔT1 or ΔT2 has elapsed since the start of the synchronization, when bit isSynch is set to TRUE in the respective transmitter of bridge B or bridge A.

The method for setting bit isSynch is described below with reference to FIG. 4.

The method begins, for example, at the beginning of the starting time. The starting time begins, for example, when activating the on-board network, in a vehicle, for example, when switching on the ignition.

After the start, bit isSynch is set=FALSE in a step 401. As a result of this, selection device 301 is operated in the first operating mode. This means that only messages for synchronization are selected. All other messages are blocked. Alternatively or in addition, it may be provided to carry out the check described above in order to favor the messages for synchronization without blocking all other messages.

Subsequently, it is checked in a step 402 whether a message is to be transmitted via master port MP. In the event a message is to be transmitted via master port MP, a step 404 is carried out. Otherwise a step 403.

In step 403, it is checked whether the message to be transmitted is to be transmitted via slave port SP. In the event a message is to be transmitted via slave port SP, a step 405 is carried out. Otherwise a step 402 is carried out.

In step 405, it is checked whether the message to be transmitted is a message "Pdelay_Req" and/or whether this was already transmitted. In the event a message "Pdelay_Req" was already transmitted, a step 409 is carried out. Otherwise a step 407 is carried out.

In step 407, bit isSynch is set to the value FALSE. Subsequently, step 402 is carried out.

In step 409, bit isSynch is set to the value TRUE. Subsequently, step 402 is carried out.

In step 404, it is checked whether the synchronization is carried out with the aid of one-step procedures. If this is the case, a step 408 is carried out. Otherwise a step 406.

In step 406, it is checked whether the message to be transmitted is a message "Pdelay_Resp_Follow-up" and/or whether this was already transmitted. If a message "Pdelay_Resp_Follow-up" was already transmitted, a step 410 is carried out. Otherwise a step 412 is carried out.

In step 408, it is checked whether the message to be transmitted is a message "Pdelay_Resp" and/or whether this was already transmitted. If a message "Pdelay_Resp" was already transmitted, a step 410 is carried out. Otherwise a step 412 is carried out.

In step 410, bit isSynch is set to the value TRUE. Subsequently, step 402 is carried out.

In step 412, bit isSynch is set to the value FALSE. Subsequently, step 402 is carried out.

The method ends, for example, with the switch-off of transmitter 300, of the respective bridge or of the on-board network.

Transmitter 300, i.e., bridge A or bridge B, is configured to carry out the method described. The method is implemented, for example, as a computer program. This computer program may be stored on a machine-readable memory medium.

A preferred transmission of the messages for synchronization is implemented by the method and the device described. If other messages are completely blocked until the synchronization has taken place, the course of the synchronization is deterministic. Thus, based on the network topology, a deterministic predication about the starting time of the network is possible.

What is claimed is:

1. A method for transferring messages in an on-board computer network of a vehicle, the method comprising:
   initiating a synchronization of slave nodes of an on-board computer network of a vehicle, the slave nodes including vehicle control devices which are connected to each other by data lines, and after the initiating, the synchronization of the slave nodes proceeding through a first bridge on the computer network based on synchronization messages;
   receiving, by a transmitter in the first bridge, a plurality of messages, the messages including (i) the synchronization messages, and (ii) other messages which are not the synchronization messages, the synchronization messages including first synchronization messages sent from a Grand Master node on the computer network to the slave nodes for the synchronization of the slave nodes, and second synchronization messages sent from the slave nodes to the Grand Master node in response to the first synchronization messages for the synchronization of the slave nodes, wherein the slave nodes are synchronized by the Grand Master node using the synchronization messages;

operating the transmitter in a first mode until the synchronization of the slave nodes has completed, wherein during the operating in the first mode, the transmitter performs:
(i) checking each message of the received plurality of messages as to whether the message is one of the synchronization messages, and
(ii) based on results of the checking: (a) transmitting in the computer network, by the transmitter, only the synchronization messages, and (b) blocking, by the transmitter, the other messages which are not the synchronization messages so that a course of the synchronization of the nodes is deterministic;
detecting, by the transmitter, that the synchronization of the slave nodes has completed; and
after the detecting, switching the transmitter from operating in the first mode to operating in a second mode, wherein in the second mode, the transmitter transmits the other messages which are not the synchronization messages.

2. The method as recited in claim 1, further comprising:
after the initiating of the synchronization of the slave nodes:
transmitting, by the Grand Master node to the slave nodes via the first bridge, the first synchronization messages, and
transmitting, by the slave nodes to the Grand Master node via the first bridge, the second synchronization messages in response to the first synchronization messages,
wherein the Grand Master synchronizes the slave nodes using the first synchronization messages and the second synchronization messages.

3. The method as recited in claim 1, wherein the initiating occurs in response to an activation of the on-board computer network when an ignition of the vehicle is switched on.

4. The method as recited in claim 1, wherein the synchronization of the slave nodes proceeds through the first bridge and a second bridge on the computer network, the first bridge being connected to the second bridge via a data connection, the first bridge being closer to the Grand Master node than the second bridge is to the Grand Master node, and wherein the transmitting includes transferring the synchronization messages from the first bridge via a master port of the first bridge to a slave port of the second bridge.

5. The method as recited in claim 1, wherein in the second mode, the transmitter selects and transmits received messages according to the Ethernet Audio Video Bridging (AVB) standard.

6. The method as recited in claim 1, wherein the transmitter is a network bridge.

7. The method as recited in claim 1, wherein the initiating of the synchronization includes starting the synchronization at a predetermined start time.

8. A device for transferring messages in an on-board computer network of a vehicle, comprising:
a non-transitory machine-readable memory medium having a computer program, which is executable by a processor, including:
a program code arrangement containing program code for transferring a message in a computer network, by performing the following:
initiating a synchronization of slave nodes of an on-board computer network of a vehicle, the slave nodes including vehicle control devices which are connected to each other by data lines, and after the initiating, the synchronization of the slave nodes proceeding through a first bridge on the computer network based on synchronization messages;
receiving, by a transmitter in the first bridge, a plurality of messages, the messages including (i) the synchronization messages, and (ii) other messages which are not the synchronization messages, the synchronization messages including first synchronization messages sent from a Grand Master node on the computer network to the slave nodes for the synchronization of the slave nodes, and second synchronization messages sent from the slave nodes to the Grand Master node in response to the first synchronization messages for the synchronization of the slave nodes, wherein the slave nodes are synchronized by the Grand Master node using the synchronization messages;
operating the transmitter in a first mode until the synchronization of the slave nodes has completed, wherein during the operating in the first mode, the transmitter performs:
(i) checking each message of the received plurality of messages as to whether the message is one of the synchronization messages, and
(ii) based on results of the checking: (a) transmitting in the computer network, by the transmitter, only the synchronization messages, and (b) blocking, by the transmitter, the other messages which are not the synchronization messages so that a course of the synchronization of the nodes is deterministic;
detecting, by the transmitter, that the synchronization of the slave nodes has completed; and
after the detecting, switching the transmitter from operating in the first mode to operating in a second mode, wherein in the second mode, the transmitter transmits the other messages which are not the synchronization messages.

9. The device as recited in claim 8, wherein in the second mode, the transmitter selects and transmits received messages according to the Ethernet Audio Video Bridging (AVB) standard.

10. The method as recited in claim 8, wherein the transmitter is a network bridge.

11. A non-transitory machine-readable memory medium on which is stored a computer program transferring messages in an on-board computer network of a vehicle, the computer program, when executed by a processor, causing the processor to perform:
initiating a synchronization of slave nodes of an on-board computer network of a vehicle, the slave nodes including vehicle control devices which are connected to each other by data lines, and after the initiating, the synchronization of the slave nodes proceeding through a first bridge on the computer network based on synchronization messages;
receiving, by a transmitter in the first bridge, a plurality of messages, the messages including (i) the synchronization messages, and (ii) other messages which are not the synchronization messages, the synchronization messages including first synchronization messages sent from a Grand Master node on the computer network to the slave nodes for the synchronization of the slave nodes, and second synchronization messages sent from the slave nodes to the Grand Master node in response to the first synchronization messages for the synchronization of the slave nodes, wherein the slave nodes are synchronized by the Grand Master node using the synchronization messages;

operating the transmitter in a first mode until the synchronization of the slave nodes has completed, wherein during the operating in the first mode, the transmitter performs:
(i) checking each message of the received plurality of messages as to whether the message is one of the synchronization messages, and
(ii) based on results of the checking: (a) transmitting in the computer network, by the transmitter, only the synchronization messages, and (b) blocking, by the transmitter, the other messages which are not the synchronization messages so that a course of the synchronization of the nodes is deterministic;

detecting, by the transmitter, that the synchronization of the slave nodes has completed; and after the detecting, switching the transmitter from operating in the first mode to operating in a second mode, wherein in the second mode, the transmitter transmits the other messages which are not the synchronization messages.

12. The non-transitory machine-readable memory medium as recited in claim 11, wherein in the second mode, the transmitter selects and transmits received messages according to the Ethernet Audio Video Bridging (AVB) standard.

13. The non-transitory machine-readable memory medium as recited in claim 11, wherein the transmitter is a network bridge.

14. A method for transferring messages in an on-board computer network of a vehicle, the method comprising:
initiating a synchronization of slave nodes of an on-board computer network of a vehicle, the slave nodes including vehicle control devices which are connected to each other by data lines, and after the initiating, the synchronization of the slave nodes proceeding through a first bridge on the computer network based on synchronization messages;
receiving, by a transmitter in the first bridge, a plurality of messages, the messages including (i) the synchronization messages, and (ii) other messages which are not the synchronization messages, the synchronization messages including first synchronization messages sent from a Grand Master node on the computer network to the slave nodes for the synchronization of the slave nodes, and second synchronization messages sent from the slave nodes to the Grand Master node in response to the first synchronization messages for the synchronization of the slave nodes, wherein the slave nodes are synchronized by the Grand Master node using the synchronization messages;
storing, by the transmitter, only the synchronization messages of the received plurality of message in a first queue, and storing, by the transmitter, the other messages of the received plurality of messages which are not the synchronization messages in a second queue different from the first queue;
operating the transmitter in a first mode until the synchronization of the slave nodes has completed, wherein during the operating in the first mode, the transmitter performs:
(i) checking whether the first queue is empty or not empty,
(ii) determining the first queue is not empty, and
(iii) based on determining the first queue is not empty:
(a) transmitting in the computer network, by the transmitter, only the synchronization messages, and
(b) blocking, by the transmitter, the other messages which are not the synchronization messages, so that a course of the synchronization of the nodes is deterministic;

detecting, by the transmitter, that the synchronization of the slave nodes has completed; and after the detecting, switching the transmitter from operating in the first mode to operating in a second mode, wherein in the second mode, the transmitter selects and transmits received messages according to the Ethernet Audio Video Bridging (AVB) standard.

15. The method as recited in claim 14, wherein during the operating in the first mode, the transmitter further performs:
(i) determining the first queue is empty, and
(ii) based on determining the first queue is empty, transmitting the other messages.

16. The method as recited in claim 14, wherein the transmitter is a network bridge.

17. A method for transferring messages in an on-board computer network of a vehicle, the method comprising:
initiating a synchronization of slave nodes of an on-board computer network of a vehicle, the slave nodes including vehicle control devices which are connected to each other by data lines, and after the initiating, the synchronization of the slave nodes proceeding through a first bridge on the computer network based on synchronization messages;
receiving, by a transmitter in the first bridge, a plurality of messages, the messages including (i) the synchronization messages, and (ii) other messages which are not the synchronization messages, the synchronization messages including first synchronization messages sent from a Grand Master node on the computer network to the slave nodes for the synchronization of the slave nodes, and second synchronization messages sent from the slave nodes to the Grand Master node in response to the first synchronization messages for the synchronization of the slave nodes, wherein the slave nodes are synchronized by the Grand Master node using the synchronization messages;
storing, by the transmitter, only the synchronization messages of the received plurality of message in a first queue, and storing, by the transmitter, the other messages of the received plurality of messages which are not the synchronization messages in a second queue different from the first queue;
operating the transmitter in a first mode until the synchronization of the slave nodes has completed, wherein during the operating in the first mode, the transmitter performs:
(i) checking whether the first queue is empty or not empty,
(ii) determining the first queue is not empty, and
(iii) based on determining the first queue is not empty:
(a) transmitting in the computer network, by the transmitter, only the synchronization messages, and
(b) blocking, by the transmitter, the other messages which are not the synchronization messages, so that a course of the synchronization of the nodes is deterministic;

detecting, by the transmitter, that the synchronization of the slave nodes has completed; and after the detecting, switching the transmitter from operating in the first mode to operating in a second mode, wherein in the second mode, the transmitter does not block the other messages which are not the synchronization messages.

\* \* \* \* \*